(12) United States Patent
Kim et al.

(10) Patent No.: US 10,088,991 B2
(45) Date of Patent: Oct. 2, 2018

(54) DISPLAY DEVICE FOR EXECUTING MULTIPLE APPLICATIONS AND METHOD FOR CONTROLLING THE SAME

(71) Applicant: Samsung Electronics Co. Ltd., Suwon-si, Gyeonggi-do (KR)

(72) Inventors: Chul-Joo Kim, Suwon-si (KR); Kang-Tae Kim, Yongin-si (KR); Eun-Young Kim, Yongin-si (KR); Ki-Hyuck Shin, Hwaseong-si (KR); Sun-Young Jeong, Suwon-si (KR); Kwang-Won Sun, Suwon-si (KR); Jae-Yul Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 550 days.

(21) Appl. No.: 13/692,273

(22) Filed: Dec. 3, 2012

(65) Prior Publication Data
US 2014/0033117 A1   Jan. 30, 2014

(30) Foreign Application Priority Data
Jul. 27, 2012  (KR) .......................... 10-2012-0082418

(51) Int. Cl.
  *G06F 3/0486* (2013.01)
  *G06F 3/0484* (2013.01)
  *G06F 3/0488* (2013.01)
  *G06F 3/0481* (2013.01)
  *G06F 9/451* (2018.01)

(52) U.S. Cl.
  CPC ........ *G06F 3/04845* (2013.01); *G06F 3/0481* (2013.01); *G06F 3/0488* (2013.01); *G06F 9/451* (2018.02); *G06F 2203/04804* (2013.01)

(58) Field of Classification Search
  CPC ................ G06F 3/0481; G06F 3/0486; G06F 2203/04804; G06F 9/4445; G06F 3/048; G06F 3/0488; G06F 2203/04806; G06F 3/04845; H04N 1/00416
  USPC .................................................. 715/796, 791
  See application file for complete search history.

(56) References Cited

U.S. PATENT DOCUMENTS

| | | | | |
|---|---|---|---|---|
| 4,807,142 | A | * | 2/1989 | Agarwal ........................ 718/100 |
| 5,675,755 | A | * | 10/1997 | Trueblood ..................... 715/791 |
| 6,025,841 | A | * | 2/2000 | Finkelstein et al. .......... 715/803 |
| 6,031,530 | A | | 2/2000 | Trueblood |

(Continued)

FOREIGN PATENT DOCUMENTS

| | | |
|---|---|---|
| CN | 1344989 A | 4/2002 |
| CN | 1458576 A | 11/2003 |

(Continued)

*Primary Examiner* — Jennifer To
*Assistant Examiner* — Terri Filosi
(74) *Attorney, Agent, or Firm* — Jefferson IP Law, LLP

(57) ABSTRACT

A method for controlling a display device that executes multiple applications and has a touch screen is provided. The control method includes displaying multiple windows for executing the multiple applications on the touch screen based on a display level of each of the windows, receiving a top-level display command for one of the multiple windows, fixing, as a top level, a display level of a top-level display window for which the top-level display command is received, and displaying the top-level display window in a level higher than the other windows.

8 Claims, 16 Drawing Sheets

(56) References Cited

U.S. PATENT DOCUMENTS

| | | | |
|---|---|---|---|
| 6,429,883 B1* | 8/2002 | Plow | G06F 3/0481 |
| | | | 715/768 |
| 6,686,852 B1 | 2/2004 | Guo | |
| 7,747,965 B2 | 6/2010 | Holecek et al. | |
| 7,793,231 B2 | 9/2010 | Berstis et al. | |
| 7,956,869 B1* | 6/2011 | Gilra | G06F 3/0481 |
| | | | 345/157 |
| 8,271,907 B2 | 9/2012 | Kim et al. | |
| 2003/0076362 A1 | 4/2003 | Terada | |
| 2003/0210270 A1 | 11/2003 | Clow et al. | |
| 2004/0056903 A1 | 3/2004 | Sakai | |
| 2005/0125741 A1* | 6/2005 | Clow | G06F 3/0481 |
| | | | 715/794 |
| 2005/0235220 A1 | 10/2005 | Duperrouzel et al. | |
| 2006/0294475 A1* | 12/2006 | Holecek et al. | 715/781 |
| 2007/0022389 A1* | 1/2007 | Ording | G06F 3/0481 |
| | | | 715/790 |
| 2007/0192726 A1 | 8/2007 | Kim et al. | |
| 2008/0172609 A1 | 7/2008 | Rytivaara | |
| 2008/0214239 A1 | 9/2008 | Hashimoto et al. | |
| 2008/0320396 A1 | 12/2008 | Mizrachi et al. | |
| 2009/0307631 A1 | 12/2009 | Kim et al. | |
| 2009/0322690 A1 | 12/2009 | Hiltunen et al. | |
| 2010/0062811 A1 | 3/2010 | Park et al. | |
| 2010/0088634 A1 | 4/2010 | Tsuruta et al. | |
| 2010/0214278 A1 | 8/2010 | Miura | |
| 2010/0248788 A1 | 9/2010 | Yook et al. | |
| 2010/0281422 A1 | 11/2010 | Kano et al. | |
| 2010/0281423 A1 | 11/2010 | Kano et al. | |
| 2010/0315438 A1* | 12/2010 | Horodezky | G06F 3/0481 |
| | | | 345/661 |
| 2011/0197160 A1 | 8/2011 | Kim et al. | |
| 2012/0176322 A1 | 7/2012 | Karmi et al. | |
| 2012/0303476 A1 | 11/2012 | Krzyzanowski et al. | |

FOREIGN PATENT DOCUMENTS

| | | |
|---|---|---|
| CN | 101352057 A | 1/2009 |
| CN | 101699395 A | 4/2010 |
| EP | 0 747 805 B1 | 4/2002 |
| JP | 10-260784 A | 9/1998 |
| JP | 2004-046796 A | 2/2004 |
| JP | 2005-259006 A | 9/2005 |
| JP | 2006-073015 A | 3/2006 |
| JP | 2006-115213 A | 4/2006 |
| JP | 2008-117181 A | 5/2008 |
| JP | 2008-134348 A | 6/2008 |
| KR | 10-0478920 B1 | 3/2005 |
| KR | 10-0650257 B1 | 11/2006 |
| KR | 10-0652626 B1 | 12/2006 |
| KR | 10-0700171 B1 | 3/2007 |
| KR | 10-2009-0016044 A | 2/2009 |
| KR | 10-0900295 B1 | 5/2009 |
| KR | 10-2010-0030968 A | 3/2010 |
| KR | 10-2010-0053823 A | 5/2010 |
| WO | 2008/090902 A1 | 7/2008 |
| WO | 2009/017175 A1 | 2/2009 |
| WO | 2009/028892 A2 | 3/2009 |

* cited by examiner

DISPLAY DEVICE FOR EXECUTING MULTIPLE APPLICATIONS AND METHOD FOR CONTROLLING THE SAME

PRIORITY

This application claims the benefit under 35 U.S.C. § 119(a) of a Korean patent application filed on Jul. 27, 2012 in the Korean Intellectual Property Office and assigned Serial No. 10-2012-0082418, the entire disclosure of which is hereby incorporated by reference.

BACKGROUND OF THE INVENTION

1. Field of the Invention

The present invention relates to a display device for executing multiple applications and a method for controlling the same. More particularly, the present invention relates to a display device and method for controlling the display of windows in which multiple applications are executed.

2. Description of the Related Art

A desktop computer is equipped with at least one display device (e.g. a monitor). A mobile device having a touch screen (e.g. a mobile phone, a smart phone, or a tablet PC) has a single display device.

A desktop user can divide the screen of a display device according to his/her work environment, for example, by dividing the screen horizontally or vertically into a plurality of windows. When a Web browser is executed, the user can move up or down on a Web page using a page-up button or a page-down button of a keyboard. If using a mouse instead of the keyboard, the user can scroll up or down on the Web page by selecting a scroll bar existing at a side of the Web page using a cursor that is controlled by the mouse. In addition, the user can move to the top of the Web page by selecting a top button displayed in the form of a text or an icon at the bottom of the Web page.

Compared to the desktop computer, a mobile device has a small screen size and suffers from input limitations. Moreover, it is difficult to divide the screen of the mobile device.

The mobile device can execute various applications including basic applications developed and installed by the manufacturer of the mobile device and additional applications downloaded from Internet application sales sites. Ordinary users may develop such additional applications and register them in such application sales sites. Therefore, anyone can sell his or her developed applications freely to mobile users on the application sales sites. As a result, tens of thousands to hundreds of thousands of free or paid applications are provided to mobile devices according to the products.

Although a variety of applications that interest consumers or satisfy their demands have been provided to mobile devices, the mobile devices are restricted in display size and User Interfaces (UIs) because they are manufactured in portable sizes. Therefore, users experience inconvenience in executing a plurality of applications on the mobile device. For example, when one application is executed in a mobile device, the application is displayed in the full screen on the display of the mobile device. If the user wants to execute another application, the user should first terminate the ongoing application and then select an execution key to execute another application. That is, to execute a plurality of applications in the mobile device, the user should repeat execution and termination of each application, which causes an inconvenience. Moreover, there is no specified method for simultaneously executing a plurality of applications in the mobile device.

Besides, when windows for multiple applications are displayed in an overlapping manner, a user may want to continuously watch the full screen of a specific window. Therefore, there is a need to develop a method and apparatus in which a specific window may be displayed in the top level.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a display device for simultaneously displaying multiple applications, and a method for controlling the same.

Another aspect of the present invention is to provide a display device for fixedly displaying a specific application among multiple applications in the top level, and a method for controlling the same.

In accordance with an aspect of the present invention, a method for controlling a display device that executes multiple applications and has a touch screen is provided. The method includes displaying multiple windows for executing the multiple applications, on the touch screen based on a display level of each of the windows, receiving a top-level display command for one of the multiple windows, fixing, as a top level, a display level of a top-level display window for which the top-level display command is received, and displaying the top-level display window in a level higher than the other windows.

In accordance with another aspect of the present invention, a display device for executing multiple applications is provided. The display device includes a touch screen for displaying multiple windows for executing the multiple applications based on a display level of each of the windows, and for receiving a top-level display command for one of the multiple windows, and a controller for fixing, as a top level, a display level of a top-level display window for which the top-level display command is received, and for displaying the top-level display window in a level higher than the other windows.

In accordance with another aspect of the present invention, a window display method for displaying multiple windows in a partially overlapping manner based on a display level of each of the windows is provided. The window display method includes setting a display level for each of the multiple windows; receiving a top-level display command for one of the multiple windows; and fixing, as a top level, a display level of a top-level display window for which the top-level display command is received.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
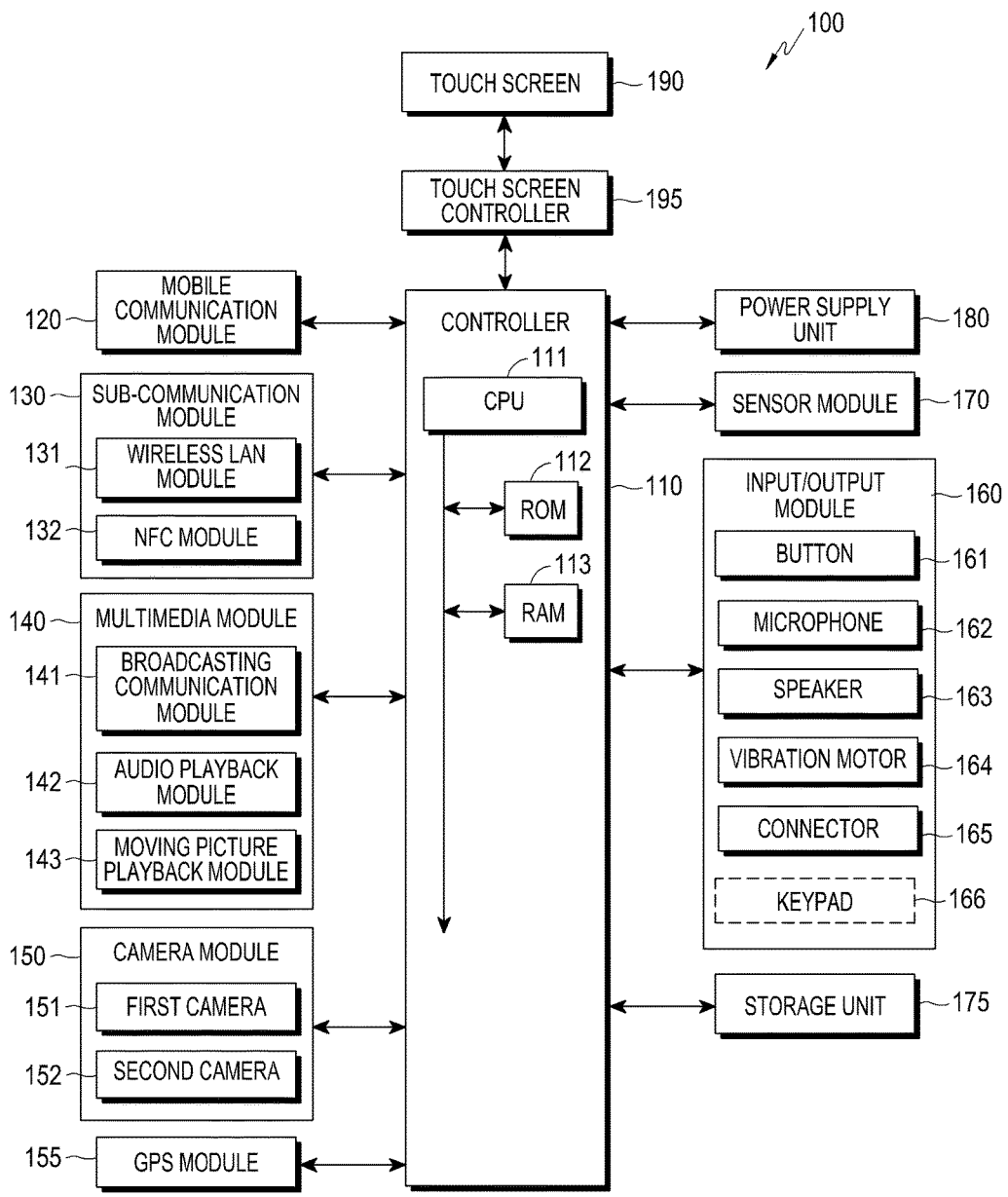
FIG. 1 is a schematic block diagram showing a device according to an exemplary embodiment of the present invention.

FIG. 1 is a schematic block diagram showing a device according to an exemplary embodiment of the present invention.

Referring to FIG. 1, a display device 100 may be connected to an external device (not shown) through a mobile communication module 120, a sub-communication module 130, and a connector 165. The term "external device" covers a variety of devices such as another device (not shown), a mobile phone (not shown), a smart phone (not shown), a tablet PC (not shown), and a server (not shown).

Referring to FIG. 1, the display device 100 includes a touch screen 190 and a touch screen controller 195. The display device 100 further includes a controller 110, the mobile communication module 120, the sub-communication module 130, a multimedia module 140, a camera module 150, a Global Positioning System (GPS) module 155, an Input/Output (I/O) module 160, a sensor module 170, a storage unit 175, and a power supply unit 180. The sub-communication module 130 includes at least one of a Wireless Local Area Network (WLAN) module 131 and a short-range communication module 132, and the multimedia module 140 includes at least one of a broadcasting communication module 141, an audio play module 142, and a video play module (e.g., a moving picture play module) 143. The camera module 150 includes at least one of a first camera 151 and a second camera 152, and the I/O module 160 includes at least one of buttons 161, a microphone 162, a speaker 163, a vibration motor 164, the connector 165, and a keypad 166.

The controller 110 may include a Central Processing Unit (CPU) 111, a Read Only Memory (ROM) 112 that stores a control program to control the display device 100, and a Random Access Memory (RAM) 113 that stores a signal or data received from the outside of the display device 100 or that is used as a memory space for an operation performed by the display device 100. The CPU 111 may include a single core, dual cores, triple cores, or quad cores. The CPU 111, the ROM 112, and the RAM 113 may be connected to each other through an internal bus.

The controller 110 can control the mobile communication module 120, the sub-communication module 130, the multimedia module 140, the camera module 150, the GPS module 155, the I/O module 160, the sensor module 170, the storage unit 175, the power supply unit 180, a touch screen 190, and the touch screen controller 195.

The mobile communication module 120 connects the display device 100 to an external device through one or more antennas (not shown) by mobile communication under the control of the controller 110. That is, the mobile communication module 120 transmits or receives a wireless signal to or from a mobile phone (not shown), a smart phone (not shown), a tablet PC (not shown), or another display device (not shown) that has a phone number input to the display device 100, in order to conduct a voice call or a video call or to provide a Short Message Service (SMS) message, or a Multimedia Messaging Service (MMS) message.

The sub-communication module 130 may include at least one of the WLAN module 131 and the short-range communication module 132. For example, the sub-communication module 130 may include either or both of the WLAN module 131 and the short-range communication module 132.

The WLAN module 131 may be connected to the Internet under the control of the controller 110 when the display device 100 is at or near a location at which a wireless Access Point (AP) (not shown) is installed. The WLAN module 131 supports the Institute of Electrical and Electronics Engineers (IEEE) WLAN standard, IEEE 802.11x. The short-range communication module 132 may wirelessly perform short-range communication between the display device 100 and an image forming device (not shown) under the control of the controller 110. Short-range communication schemes may include Bluetooth, Infrared Data Association (IrDA), etc.

The display device 100 may include at least one of the mobile communication module 120, the WLAN module 131, and the short-range communication module 132 according to its capabilities. For example, the display device 100 may include a combination of the mobile communication module 120, the WLAN module 131, and the short-range communication module 132 according to its capabilities.

The multimedia module 140 may include the broadcasting communication module 141, the audio play module 142, and/or the video play module 143. The broadcasting communication module 141 may receive a broadcast signal (for example, a TV broadcast signal, a radio broadcast signal, or a data broadcast signal) and additional broadcasting information (for example, an Electric Program Guide (EPG) or Electric Service Guide (ESG)) from a broadcasting station through a broadcasting communication antenna (not shown) under the control of the controller 110. The audio play module 142 can open and play a stored or received digital audio file (for example, a file having a filename extension of .mp3, .wma, .ogg, .wav, etc.) under the control of the controller 110. The video play module 143 may open and play a stored or received digital video file (for example, a file having a filename extension of .mpeg, .mpg, .mp4, .avi, .mov, .mkv etc.) under the control of the controller 110. The video play module 143 can open and play a digital audio file.

The multimedia module 140 may include the audio play module 142, the video play module 143, and/or the broadcasting communication module 141. Furthermore, either or both of the audio play module 142 and the video play module 143 of the multimedia module 140 may be incorporated into the controller 110.

The camera module 150 may include at least one of the first camera 151 and the second camera 152, for capturing a still image or a video under the control of the controller 110. Further, the first camera 151 or the second camera 152 may include an auxiliary light source (for example, a flash (not shown)) for providing a light intensity required for capturing an image. The first camera 151 may be disposed on the front surface of the display device 100, and the second camera 152 may be disposed on the rear surface of the device 100. In the alternative, the first camera 151 and the second camera 152 may be arranged near to each other (for example, the distance between the first camera 151 and the second camera 152 is larger than 1 cm and smaller than 8 cm) in order to capture a three-dimensional (3D) still image or video.

The GPS module 155 may receive radio waves from one or more GPS satellites (not shown) in Earth orbit and determine a position of the display device 100 based on the Time of Arrival (ToA) of satellite signals from the GPS satellites to the display device 100.

The I/O module 160 may include at least one of a plurality of buttons 161, the microphone 162, the speaker 163, the vibration motor 164, the connector 165, and the keypad 166.

The buttons 161 may be formed on the front surface, a side surface, or the rear surface of a housing of the display device 100, and may include at least one of a power/lock button (not shown), a volume button (not shown), a menu button, a home button, a back button, and a search button.

The microphone 162 receives a voice or sound and converts the received voice or sound to an electrical signal under the control of the controller 110.

The speaker 163 may output sounds corresponding to various signals (for example, a wireless signal, a broadcasting signal, a digital audio file, a digital video file, file taking, etc.) received from the mobile communication module 120, the sub-communication module 130, the multimedia module 140, and the camera module 150 to the outside of the display device 100, under the control of the controller 110. The speaker 163 may output sounds corresponding to functions (for example, a button control sound or a ring back tone for a call) performed by the display device 100. One or more speakers 163 may be formed at an appropriate position or positions of the housing of the display device 100.

The vibration motor 164 may convert an electrical signal to a mechanical vibration under the control of the controller 110. For example, when the display device 100 receives an incoming voice call from another display device (not shown) in a vibration mode, the vibration motor 164 operates. One or more vibration motors 164 may be mounted inside the housing of the display device 100. The vibration motor 164 may operate in response to a user's touch on the touch screen 190, a continuous movement of the touch on the touch screen 190, etc.

The connector 165 may be used as an interface for connecting the display device 100 to an external device (not shown) or a power source (not shown). The connector 165 may transmit data stored in the storage unit 175 to the external device via a cable connected to the connector 165 or may receive data from the external device, under the control of the controller 110. Power may be supplied or a battery (not shown) is recharged from the power source via the cable connected to the connector 165.

The keypad 166 may receive a key input from the user to control the display device 100. The keypad 166 includes a physical keypad (not shown) formed in the display device 100 or a virtual keypad (not shown) displayed on the touch screen 190. The physical keypad may be omitted according to the capabilities or configuration of the display device 100.

The sensor module 170 includes at least one sensor for detecting a state of the display device 100. For example, the sensor module 170 may include a proximity sensor for detecting whether the user is close to the display device 100, an illumination sensor (not shown) for detecting the amount of ambient light around the display device 100, or a motion sensor (not shown) for detecting a motion of the display device 100 (for example, rotation, acceleration or vibration of the display device 100). At least one sensor may detect a state of the display device 100, generate a signal corresponding to the detected state, and transmit the generated signal to the controller 110. A sensor may be added to or removed from the sensor module 170 according to the capabilities of the display device 100.

The storage unit 175 may store input/output signals or data in accordance with operations of the mobile communication module 120, the sub-communication module 130, the multimedia module 140, the camera module 150, the GPS module 155, the I/O module 160, the sensor module 170, and the touch screen 190 under the control of the controller 110. The storage unit 175 may store a control program for controlling the display device 100 or the controller 110, and applications.

The term "storage unit" covers the storage unit 175, the ROM 112 or the RAM 113 within the controller 110, or a memory card (not shown) (for example, an Secure Digital (SD) card or a memory stick) mounted in the display device 100. The storage unit may include a non-volatile memory, a volatile memory, a Hard Disk Drive (HDD), or a Solid State Drive (SSD).

The power supply unit 180 may supply power to one or more batteries (not shown) disposed in the housing of the display device 100 under the control of the controller 110. The one or more batteries supply power to the display device 100. Further, the power supply unit 180 may supply power received from an external power source (not shown) via the cable connected to the connector 165 to the display device 100.

The touch screen 190 may provide User Interfaces (UIs) corresponding to various services (for example, call, data transmission, broadcasting, photo taking, etc.) to the user. The touch screen 190 may transmit an analog signal corresponding to at least one touch on a UI to the touch screen controller 195. The touch screen 190 may receive at least one touch input through a user's body part (for example, a finger) or a touch input tool (for example, a stylus pen). Also, the touch screen 190 may receive a touch input signal corresponding to a continuous movement of a touch among one or more touches. The touch screen 190 may transmit an analog signal corresponding to the continuous movement of the input touch to the touch screen controller 195.

In exemplary embodiments of the present invention, a 'touch' may include a non-contact touch (for example, the detectable gap between the touch screen 190 and the user's body part or the touch input tool is equal to or smaller than 1 mm), and is not limited to contacts between the touch screen 190 and the user's body part or the touch input tool. The detectable gap of the touch screen 190 may vary according to the capabilities or configuration of the display device 100.

The touch screen 190 may be implemented in, for example, a resistive type, a capacitive type, an infrared type, an acoustic wave type, etc.

The touch screen controller 195 converts an analog signal received from the touch screen 190 to a digital signal (for example, X and Y coordinates) and transfers it to the controller 110. The controller 110 may control the touch screen 190 using the digital signal received from the touch screen controller 195. For example, the controller 110 may control the selection or execution of a shortcut icon (not shown) displayed on the touch screen 190 in response to a touch. The touch screen controller 195 may be incorporated into the controller 110.

Figure 2A:
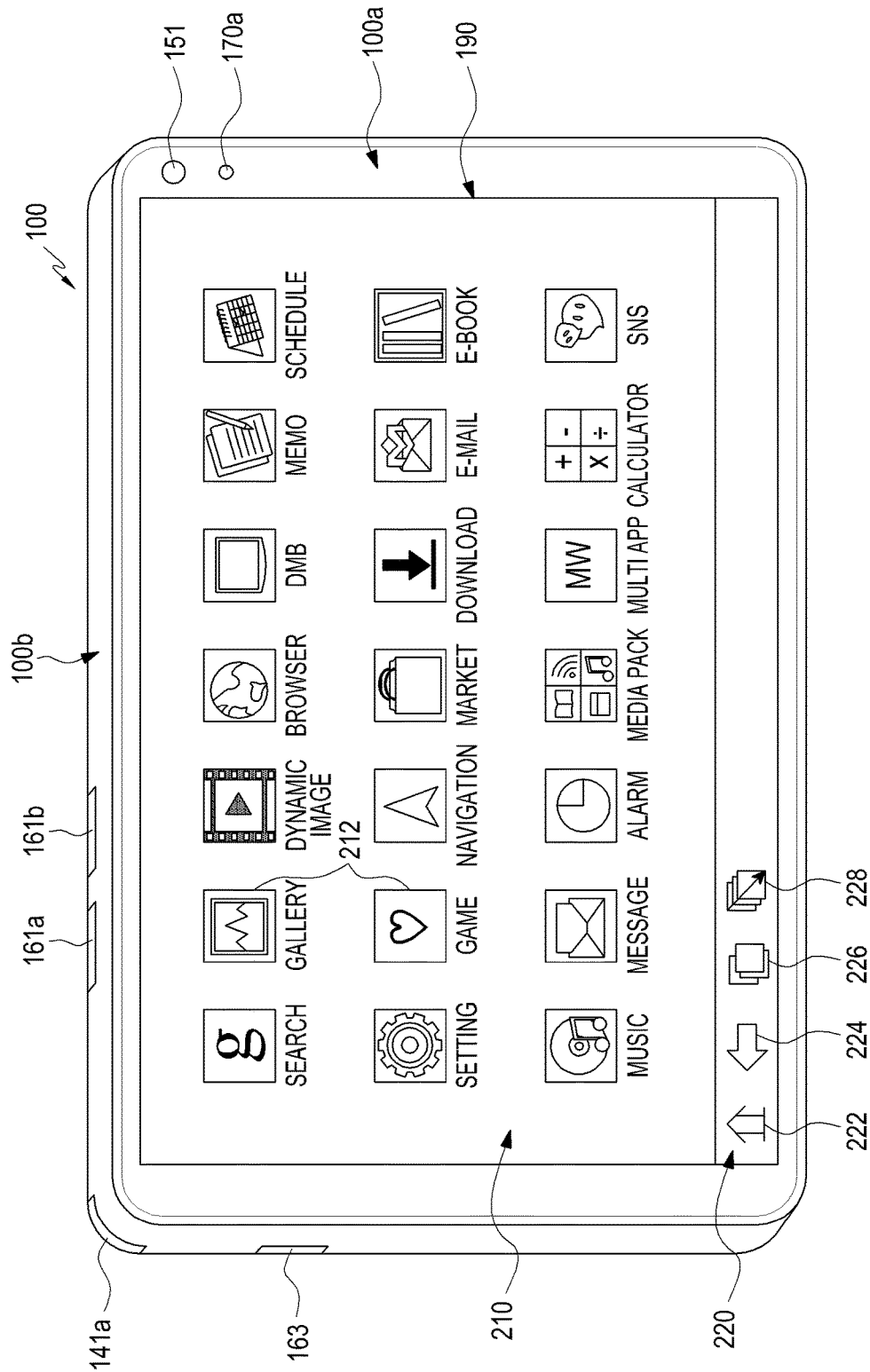
FIG. 2A is a perspective view of a device according to an exemplary embodiment of the present invention.

FIG. 2A is a perspective view of a device according to an exemplary embodiment of the present invention.

Referring to FIG. 2A, the touch screen 190 is disposed at the center of the front surface 100a of the display device 100. The touch screen 190 has a large size so as to occupy almost the entire front surface 100a of the display device 100. The first camera 151 and an illumination sensor 170a may be disposed at an edge of the front surface 100a of the display device 100. For example, a power/reset button 161a, a volume button 161b, the speaker 163, a terrestrial Digital Multimedia Broadcasting (DMB) antenna 141a for receiving a broadcast signal, the microphone (not shown), the connector (not shown), and the like may be disposed on a side surface 100b of the display device 100, and the second camera (not shown) may be disposed on the rear surface (not shown) of the display device 100.

The touch screen 190 includes a main screen 210 and a bottom bar 220. In FIG. 2A, each of the display device 100 and the touch screen 190 has a horizontal length larger than a vertical length. In this case, it is defined that the touch screen 190 is horizontally arranged.

The main screen 210 is an area where one or more applications are executed. FIG. 2A illustrates an example of displaying a home screen on the touch screen 190. The home screen is the first screen to be displayed on the touch screen 190 when the display device 100 is powered on. Execution keys 212 for executing a plurality of applications stored in the display device 100 are arranged in rows and columns on the home screen. The execution keys 212 may take the form of icons, buttons, texts or the like. When each execution key 212 is touched, an application corresponding to the touched execution key 212 is executed and then displayed on the main screen 210.

The bottom bar 220 is elongated along a horizontal direction at the bottom of the touch screen 190 and includes standard function buttons 222, 224, 226, and 228. A home screen button 222 is used to display the home screen on the main screen 210. For example, when the home screen button 222 is touched during execution of applications on the main screen 210, the home screen is displayed on the main screen 210 as illustrated in FIG. 2A. A back button 224 displays the screen executed just before a currently executed screen or terminates the latest used application. A multi-view mode button 226 displays a plurality of applications on the main screen 210 in a multi-view mode according to exemplary embodiments of the present invention. A mode switching button 228 switches the display mode of a plurality of currently executed applications to another mode on the main screen 210. For example, when the mode switching button 228 is touched, the display device 100 switches between a freestyle mode and a split mode. In the freestyle mode, multiple applications are freely displayed in the same position so they may be partially overlapped. In the split mode, the multiple applications are displayed separately in different areas of the main screen 210.

A top bar (not shown) may be displayed at the top of the touch screen 190 to display states of the display device 100 such as the charged state of the battery, the intensity of a received signal, the current time, etc.

The bottom bar 220 and the top bar (not shown) may be omitted on the touch screen 190 according to an Operating System (OS) of the display device 100 or an application executed in the display device 100. When both the bottom bar 220 and the top bar are not displayed on the touch screen 190, the main screen 210 may occupy the entire area of the touch screen 190. Further, the bottom bar 220 and the top bar may be displayed, semi-transparently overlaid on the main screen 210.

Figure 2B:
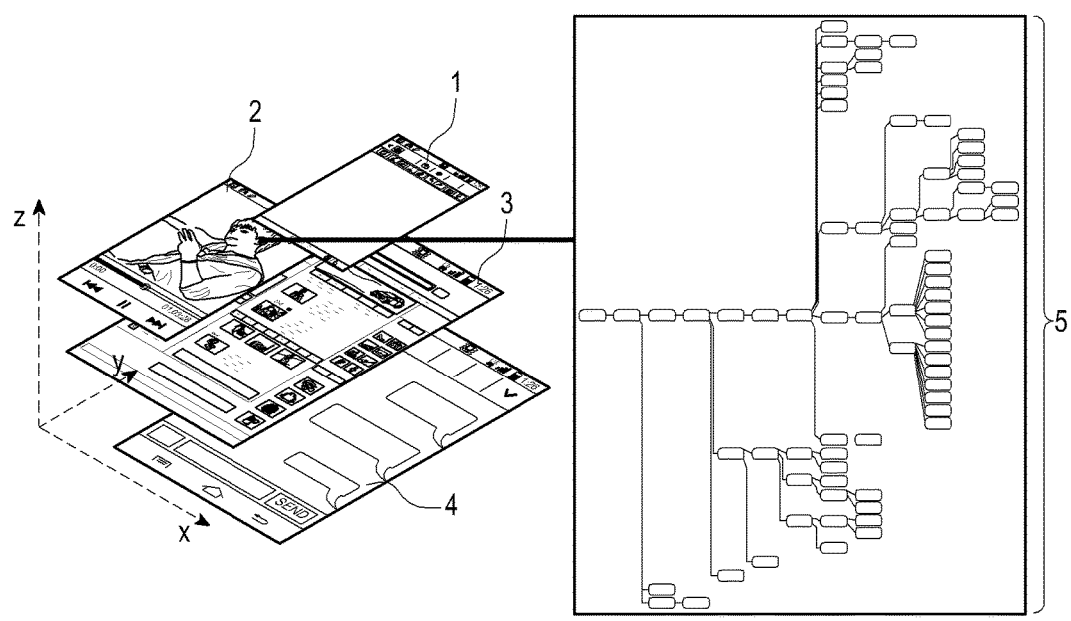
FIG. 2B is a conceptual diagram for a description of a Z-order according to an exemplary embodiment of the present invention.

FIG. 2B is a conceptual diagram for a description of a Z-order according to an exemplary embodiment of the present invention.

Referring to FIG. 2B, a Z-order of a screen (i.e., along a Z axis of a 3 dimensional coordinate system) is divided into N layers, and an N-th layer may correspond to an upper layer positioned to be higher than an (N−1)-th layer. Each layer has an associated window, on which an application may be executed. In other words, if a first application is selected, it is executed in a window on a first layer. Thereafter, if a second application is selected, it is executed in a window on a second layer. Similarly, if a third application is selected, it is executed in a window on a third layer. In this way, the first, second and third layers may be generated hierarchically. In other words, the last generated layer may exist in the top level, or may be displayed in the top level. For example, multiple windows 1 to 4 may be displayed on the main screen 210, overlapping one another. More specifically, the first window 1 is displayed, covering the second to fourth windows 2 to 4, the second window 2 is displayed, covering the third and fourth windows 3 and 4, and the third window 3 is displayed, covering the fourth window 4. In other words, when overlapping one another, the multiple windows 1 to 4 may have the order in which they are displayed, and the order of being displayed may be called a Z-order. The Z-order may be a display order (or display level) of a window on the z-axis. A hierarchy viewer 5 may be a screen which is displayed hierarchizing the Z-order. The Z-order may also be named 'display order'.

Figure 3A:
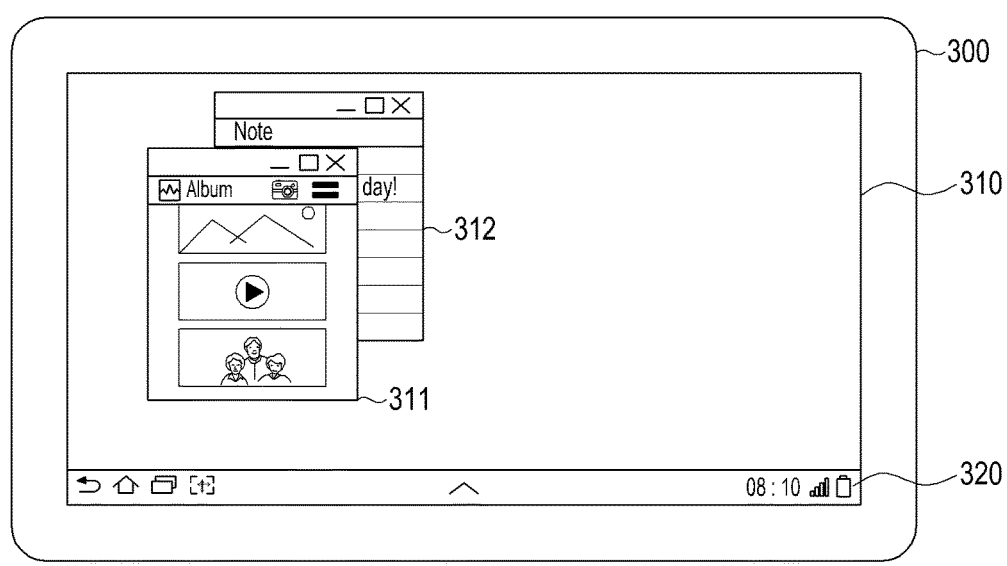
FIG. 3A shows a window display screen according to an exemplary embodiment of the present invention.

FIG. 3A shows a window display screen according to an exemplary embodiment of the present invention.

Referring to FIG. 3A, a display device 300 includes a touch screen 310, on which multiple windows 311 and 312 are displayed. Further, a bottom bar 320 is displayed at the bottom of the touch screen 310.

The window may be an area that includes an execution screen of a specific application, and a title bar and a control area for the application being executed. Objects associated with the application may be displayed on the execution screen of the application. The objects may be composed of various components such as a text, a shape, an icon, a button, a check box, a picture, a video, a web, a map, etc. If a user touches an object, a function or an event predetermined in the object may be performed in an application corresponding to the object. Depending on the operating system, the object may be called a 'view'. The title bar may be an area in which an identifier and an application toolbar of an application executed in the window are displayed. In addition, the control area may be an area where display and termination of the window are controlled. For example, the control area may include a window-minimize button, a window-maximize button, a window-exit button, etc.

Applications are programs which are implemented independently of each other by the manufacturer of the display device 300 or the application developers. Accordingly, before one application is executed, another application does not need to be executed in advance. In addition, even though one application is terminated, another application may be continuously executed.

Applications are distinguishable from a multifunctional application to which some functions (e.g., a memo function, a messaging function, etc.) provided by other applications are added in one application (e.g., a video application), because the applications are programs which are implemented independently of each other. However, this multifunctional application is different from the existing applications, as it is a single application that is newly produced to have a variety of functions. Therefore, the multifunctional application provides only limited functions without providing a variety of functions like the existing applications, and the user needs to separately purchase the new multifunctional application, which is a burden on the user.

The controller 110 controls the multiple windows 311 and 312 to be displayed partially overlapping each other. The controller 110 may set a different display level for each of the multiple windows 311 and 312. For example, the controller 110 may set a first display level for the window 311, and set a second display level for the window 312. Accordingly, the controller 110 displays the window 311 having a higher display level to cover the window 312. Of the area of the window 312 having a lower display level, the portion overlapping with the window 311 having a higher display level is not displayed.

The controller 110 may set the top display level for the window in which a control event is entered most recently. For example, if the user touches the window 311, the controller 110 sets the top display level for the window 311.

Figure 3B:
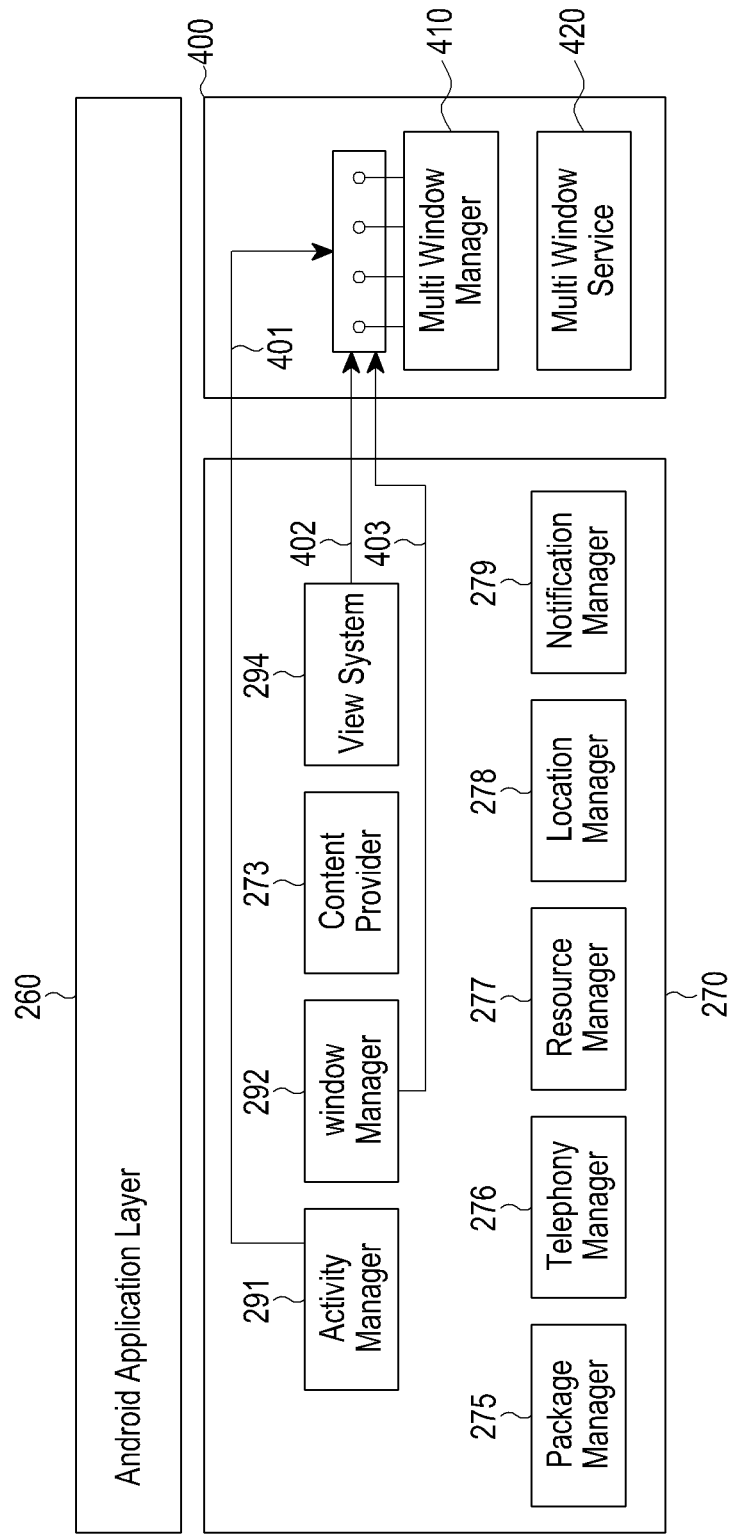
FIG. 3B is a conceptual diagram for a description of a framework according to an exemplary embodiment of the present invention.

FIG. 3B is a conceptual diagram for a description of a framework according to an exemplary embodiment of the present invention.

As illustrated in FIG. 3B, an activity manager 291, a window manager 292 and a view system 294 in a framework 270 are compatible with a multi-window framework 400. The multi-window framework 400 includes a multi-window manager 410 and a multi-window service 420.

The activity manager 291, the window manager 292 and the view system 294 may perform a function of invoking an Application Program Interface (API) for multiple windows. The activity manager 291 communicates with the multi window manager 410 via a connector 401. Likewise, the view system 294 and the window manager 292 communicate with the multi window manager 410 via connectors 402 and 403. A content provider 273, a package manager 275, a telephony manager 276, a resource manager 277, a location manager 278 and a notification manager 279 are compatible with the multi-window framework 400.

The multi-window manager 410 provides a function of the multi-window service 420 to the user in the form of an API, and the manager/service mechanism may operate based on Inter-Process Communication (IPC).

The multi-window service 420 tracks an execution lifecycle of applications which are executed in multiple windows, and manages the state of each application, such as a size and a position.

An invoked API may manage a size, a position and a visibility of each application.

As described above, the framework proposed by exemplary embodiments of the present invention may be performed by providing an independent multi-window framework and invoking an API.

In addition, an application layer 260 may directly invoke an API from the multi-window manager 410. In other words, even if a new application is developed, the user may invoke and use an API provided from the multi-window manager 410.

As described above, the present invention adopts the multi-window framework 400, making it possible to simultaneously display two or more applications.

Figure 3C:
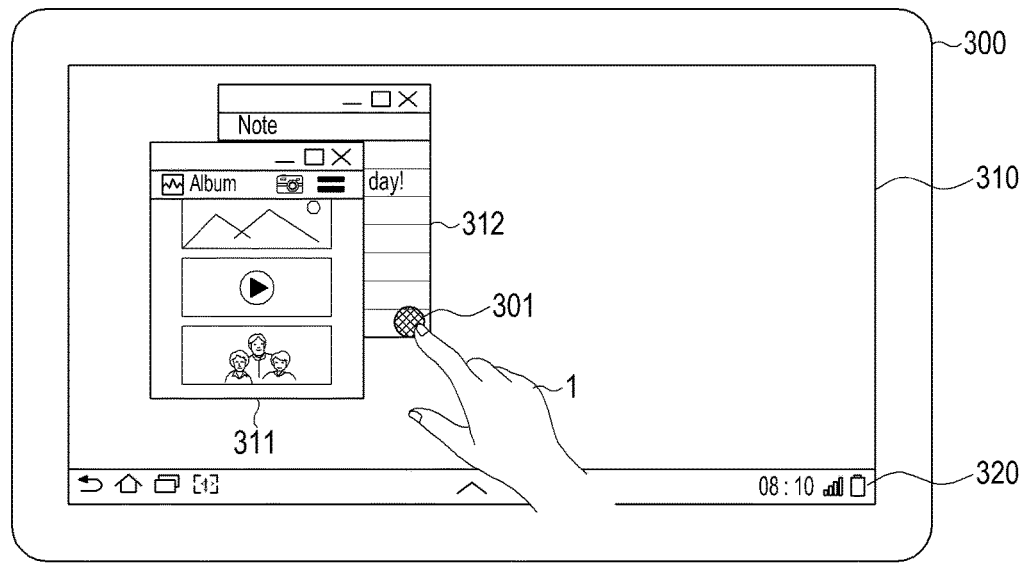
FIG. 3C shows a screen for a description of a change in display level according to an exemplary embodiment of the present invention.

FIG. 3C shows a screen for a description of a change in display level according to an exemplary embodiment of the present invention.

Referring to FIG. 3C, a user 1 touches the window 312. Then, the controller 110 sets the top display level for the window 312 in which a control event is entered most recently. In addition, the controller 110 sets the next highest display level for the window 311 having the existing top display level. In other words, the controller 110 sets the display level of the window 311 by decreasing it by one level.

Figure 3D:
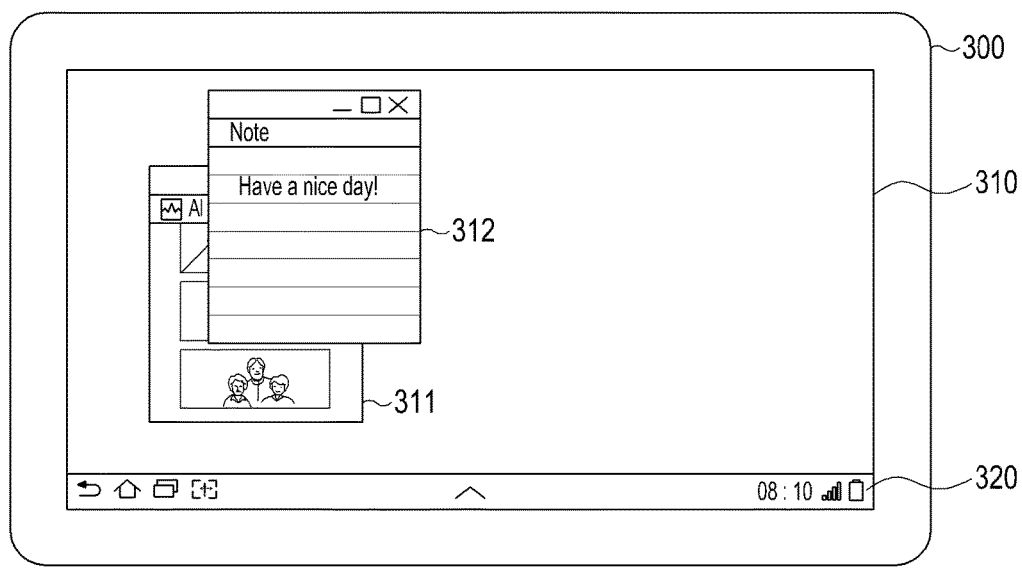
FIG. 3D shows a screen on which windows are displayed, whose display levels are changed according to an exemplary embodiment of the present invention.

FIG. 3D shows a screen on which windows are displayed, whose display levels are changed, according to an exemplary embodiment of the present invention.

Referring to FIG. 3D, the window 312 with the top display level may be displayed covering the window 311. Of the area of the window 311 having the lower display level, the portion overlapping with the window 312 having the higher display level is not displayed.

Figure 3E:
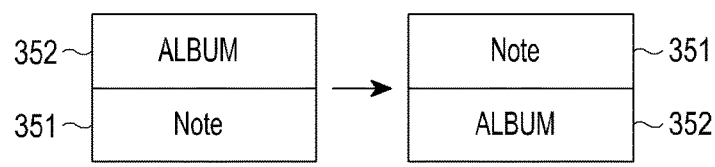
FIG. 3E is a conceptual diagram of a task stack according to an exemplary embodiment of the present invention.

FIG. 3E is a conceptual diagram of a task stack according to an exemplary embodiment of the present invention.

Referring to FIG. 3E, the task stack may set a high level for an application in which a control event is entered most recently. In the example of FIG. 3A, an album application 352, associated with window 311, has a higher task priority than a note application 351, associated with window 312. However, in the example of FIG. 3D, the note application 351 has a higher task priority than the album applicable 352. This is reflected in FIG. 3E on the right side of the arrow showing that the applications in the task stack have been switched in accordance with the most recent control event associated with the note application 351.

Figure 3F:
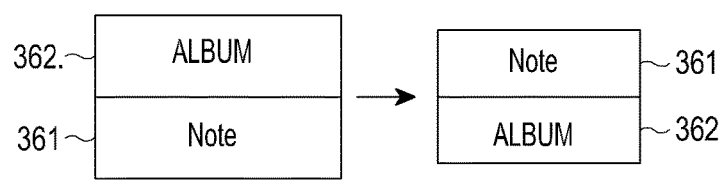
FIG. 3F is a conceptual diagram of a display stack according to an exemplary embodiment of the present invention.

FIG. 3F is a conceptual diagram of a display stack according to an exemplary embodiment of the present invention.

Referring to FIG. 3F, the display stack, like the task stack, may set a high level for an application in which a control event is entered most recently. For example, in the example of FIG. 3A, an album application 362, associated with window 311, has a higher display level than a note application 361, associated with window 312. However, in the example of FIG. 3D, the note application 361 has a higher display level than the album applicable 362.

In other words, the controller 110 may set the task stack and the display stack in the same manner.

Figure 3G:
FIG. 3G is a conceptual diagram of a display stack updated when a new application is executed according to an exemplary embodiment of the present invention.

FIG. 3G is a conceptual diagram of a display stack updated when a new application is executed according to an exemplary embodiment of the present invention.

Referring to FIG. 3G, it is assumed that A to D applications 371 to 374 are being executed. A user may input a top-level display command for the A application 371 and the B application 372. The user may execute a new application 375. The controller 110 first sets the top display level for the new application 375. In addition, the controller 110 may adjust the display level of the new application 375 to the next highest display level after the top display level of the A and B applications 371 and 372 which received the top-level display command. The controller 110 adjusts the display level of the new application 375 to be higher than that of the other applications 373 and 374. As described above, the controller 110 may control the A and B applications, which received the top-level display command, to have the top display level, even though the new application 375 last selected by the user is executed. The top level of the display stack may correspond to the most recently executed application or the last selected top-level display application.

Figure 4:
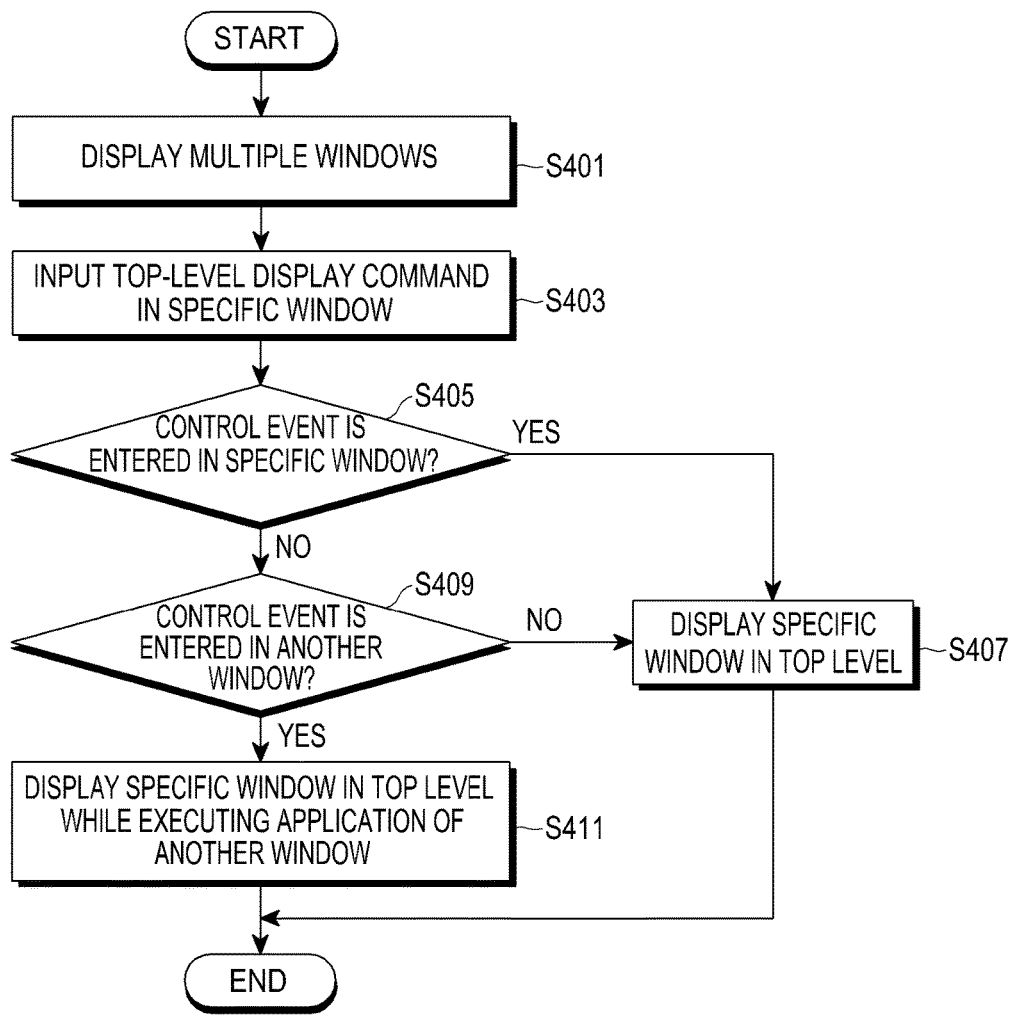
FIG. 4 is a flowchart of a window display method according to an exemplary embodiment of the present invention.

FIG. 4 is a flowchart of a window display method according to an exemplary embodiment of the present invention.

Referring to FIG. 4, a display device displays multiple windows on a touch screen in step S401.

A user may input a top-level display command to a specific window that he/she wants to watch continuously. The top-level display command may be a command for controlling a specific window to be displayed higher than other windows at all times. Inputting the top-level display command may correspond to, for example, touching a top-level display command button displayed in a specific window.

In step S403, the display device receives a top-level display command that the user inputs in a specific window. Upon receiving the top-level display command, the display device sets the top display level for the specific window.

In step S405, the display device determines if a control event is entered in the specific window. If it is determined that a control event is entered in the specific window (Yes in step S405), the display device displays the specific window in the top level in step S407. However, if it is determined that no control event is entered in the specific window (No in step S405), the display device determines in step S409 whether a control event is entered in another window. If no control event is entered in another window (No in step S409), the display device displays the specific window in the top level in step S407. However, if a control event is entered in another window (Yes in step S409), the display device may display the specific window in the top level while executing an application of another window, in step S411. In other words, the display device sets the top task priority for another window in which a control event is entered, and fixes the top display level for the specific window. The display device may set the next highest display level for another window in which a control event is entered.

FIGS. 5A to 5E show screens of a display device according to an exemplary embodiment of the present invention.

Figure 5A:
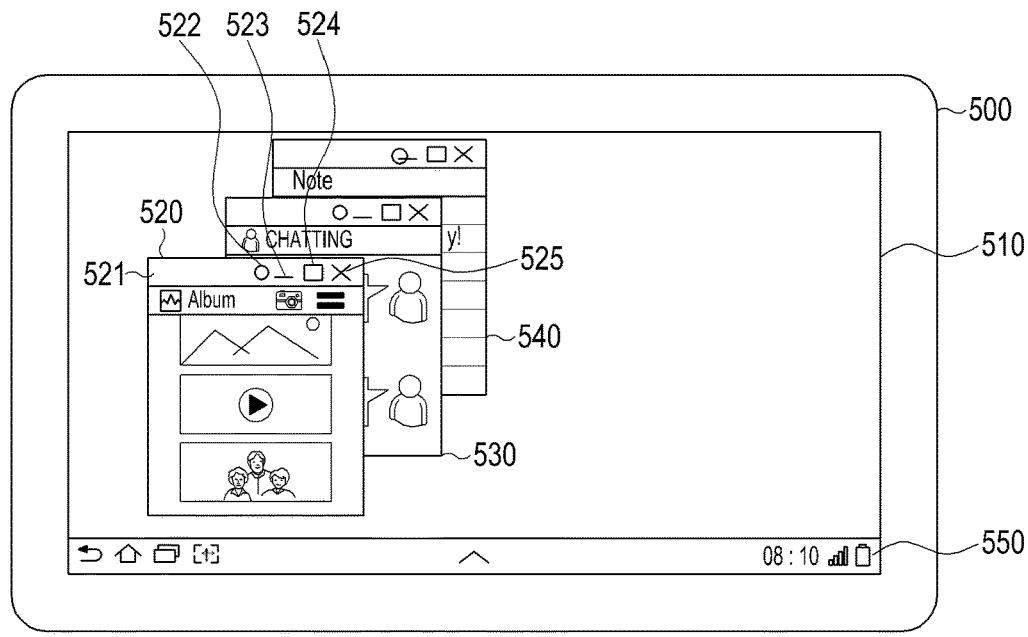
FIGS. 5A to 5E show screens of a display device according to an exemplary embodiment of the present invention.

Referring to FIG. 5A, a display device 500 displays a first window 520, a second window 530, and a third window 540 on a touch screen 510. A bottom bar 550 may be displayed at the bottom of the touch screen 510.

In the example of FIG. 5A, the first window 520 includes a control area 521. The control area 521 includes a top-level display command button 522, a minimize button 523, a maximize button 524, and an exit button 525. The user may touch the top-level display command button 522. In response, the controller 110 may recognize that a top-level display command is entered in the window. Then, the controller 110 sets the top display level (or a first display level) for the first window 520, and fixes the set display level. A second display level may be set for the second window 530, and a third display level may be set for the third window 540.

Figure 5B:
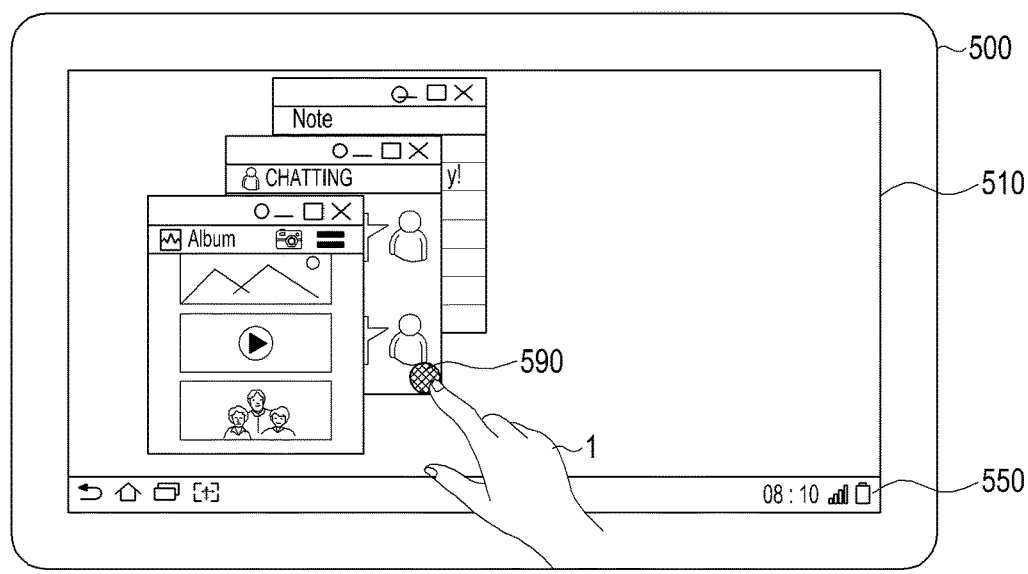

In FIG. 5B, the user 1 may enter a control event by a touch 590 in the second window 530. Then, the controller 110 sets a first task priority for the second window 530. The controller 110 fixes a display level of the first window 520 to the first display level, and sets a display level of the second window 530 as a second display level. In other words, the controller 110 sets the second highest display level for the second window 530. Although user 1 touches the window with the user's finger as illustrated in FIG. 5B, user 1 may touch the window with a stylus pen or other input means.

Figure 5C:
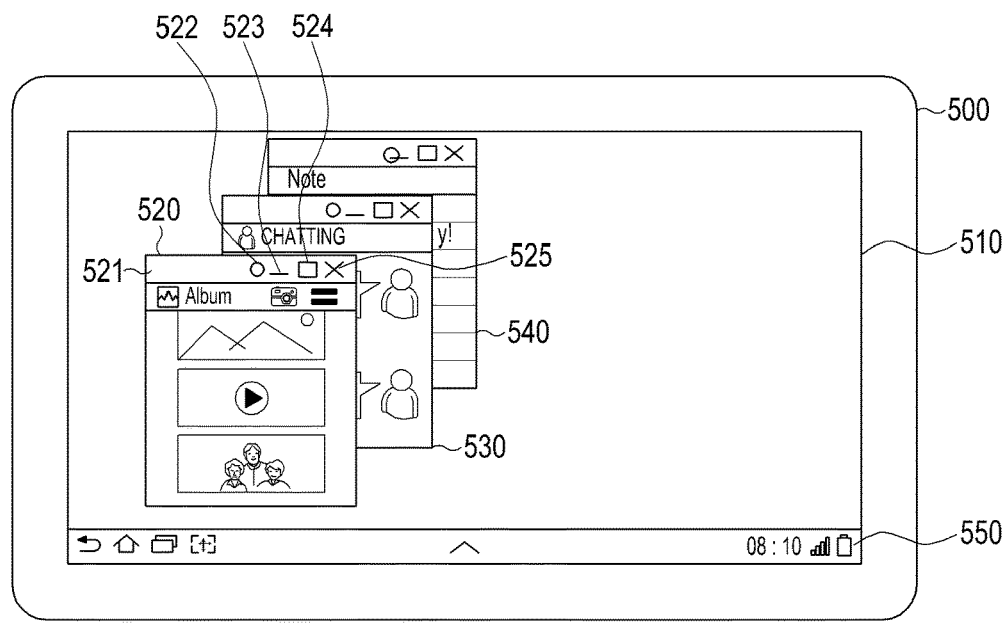

Accordingly, the controller 110 displays the first window 520 to cover the second window 530 as shown in FIG. 5C. In the meantime, the application being executed in the second window 530 may be executed continuously.

Figure 5D:
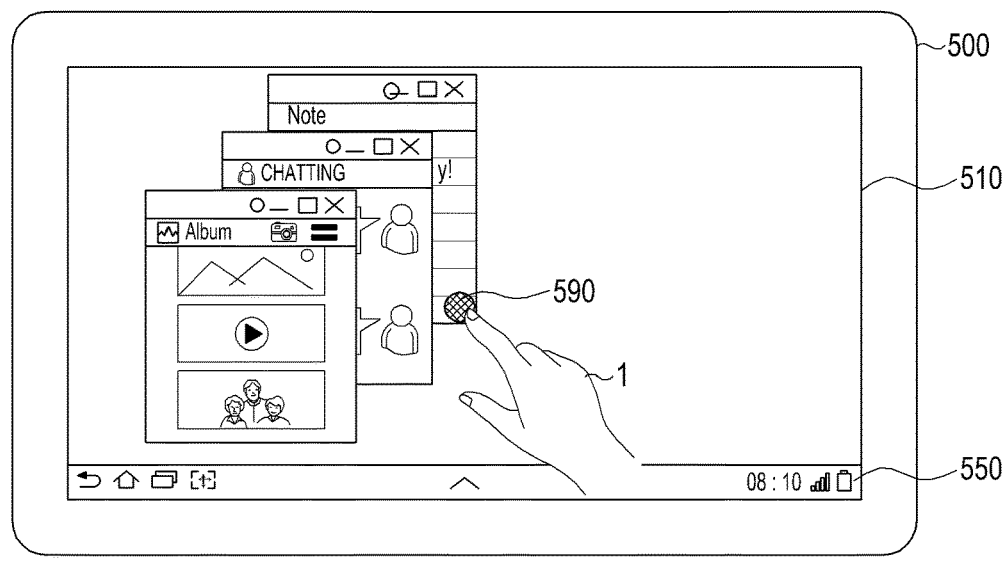

As shown in FIG. 5D, the user 1 may enter a control event by a touch 590 in the third window 540. Then, the controller 110 sets a first task priority for the third window 540. The controller 110 fixes a display level of the first window 520 to the first display level, and sets a display level of the third window 540 as a second display level. In other words, the controller 110 sets the second highest display level for the third window 540. In addition, the controller 110 sets a third display level for the second window 530.

Figure 5E:
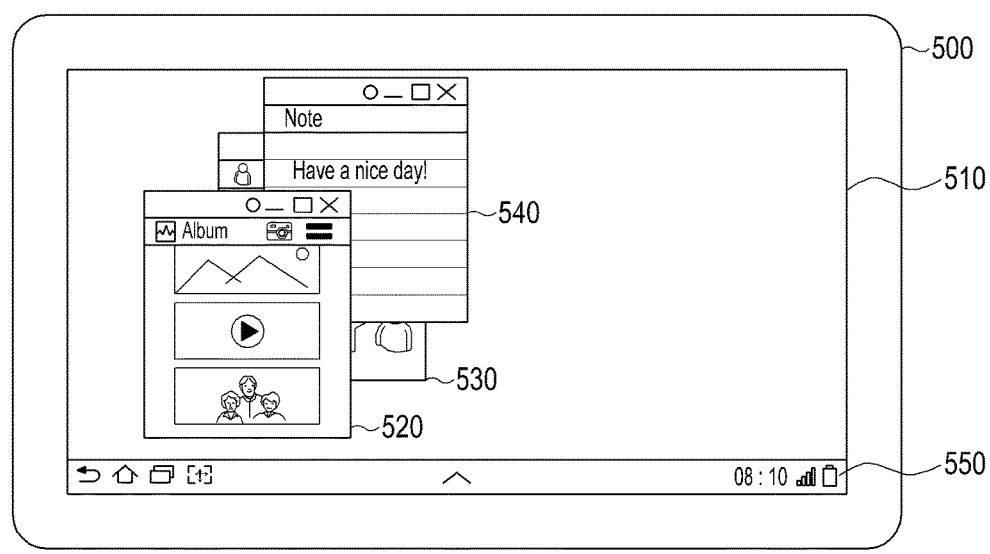

Accordingly, as shown in FIG. 5E, the controller 110 displays the first window 520 to cover the second window 530 and the third window 540. Further, the controller 110 displays the third window 540 to cover the second window 530. In the meantime, the application being executed in the third window 540 may be executed continuously.

Figure 6A:
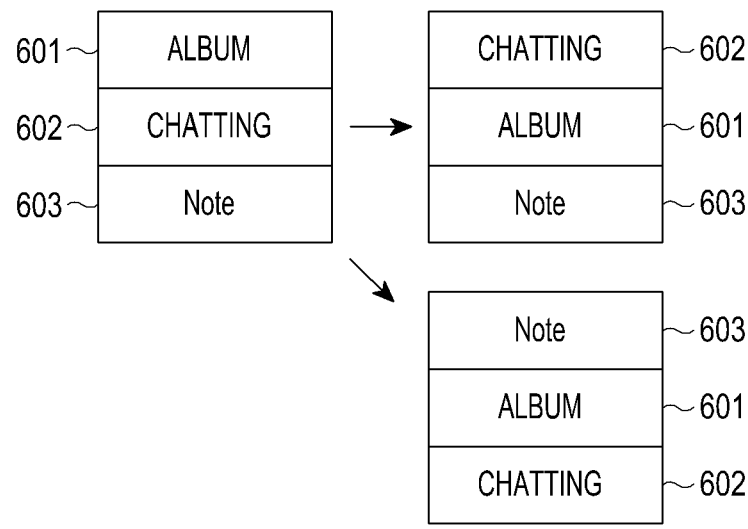
FIGS. 6A and 6B show a task stack and a display stack, respectively according to an exemplary embodiment of the present invention.
Figure 6B:
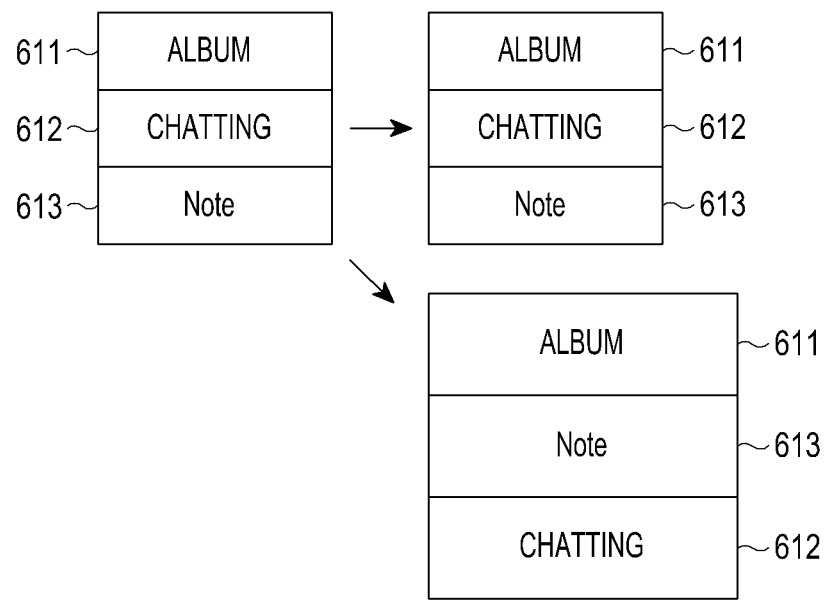

FIGS. 6A and 6B show a task stack and a display stack, respectively, according to an exemplary embodiment of the present invention. It is assumed in FIGS. 6A and 6B that a top-level display command is entered in a window for an album application. In addition, a control event is assumed to be entered in a window for a chatting application.

Referring to FIG. 6A, the controller 110 first sets a first task priority for an album application 601, a second task priority for a chatting application 602, and a third task priority for a note application 603. The controller 110 next sets a first task priority for the chatting application 602, and a second task priority for the album application 601, changing the task priorities, based on the control event entered in the window for the chatting application 602. However, the controller 110 holds a third task priority for a note application 603. Also shown in FIG. 6A is the result of a change in task priorities if the control event is entered in the window for the note application 603. In that case, the controller 110 sets the first task priority for the note application 603, the second task priority for the album application 601, and the third task priority for the chatting application 602.

As shown in FIG. 6B, the controller 110 fixes a first display level for an album application 611. Further, the controller 110 sets a second display level for a chatting application 612, and a third display level for a note application 613. Notably, these do not change.

Figure 7:
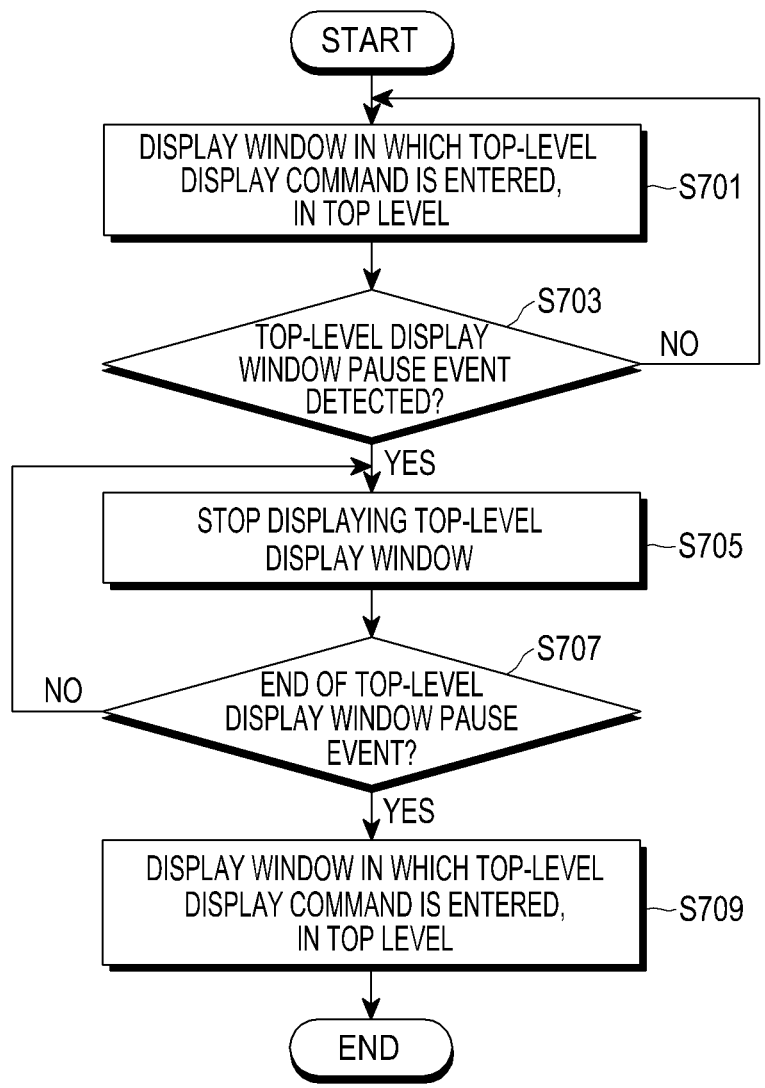
FIG. 7 is a flowchart of a window display method according to an exemplary embodiment of the present invention.

FIG. 7 is a flowchart of a window display method according to an exemplary embodiment of the present invention.

Referring to FIG. 7, a display device displays a window in which a top-level display command is entered, in the top level in step S701. In step S703, the display device determines whether a top-level display window pause event for temporarily stopping (or pausing) the displaying of the top-level display window is detected.

If the top-level display window pause event is detected (Yes in step S703), the display device stops displaying the top-level display window in step S705. The display device determines in step S707 whether the top-level display window pause event ends. The display device stops displaying the top-level display window by returning to step S705 until the top-level display window pause event ends. The display device keeps the top display level that is set for the top-level display window. The display device may stop displaying the top-level display window by adjusting a visibility of the top-level display window to zero (0), adjusting a size of the top-level display window to zero (0), or placing display coordinates of the top-level display window in the outskirts of the touch screen.

If the top-level display window pause event ends (Yes in step S707), the display device displays again the top-level display window in the top level in step S709. The display device keeps the top display level that is set for the top-level display window.

FIGS. 8A to 8E show screens of a display device according to an exemplary embodiment of the present invention.

Figure 8A:
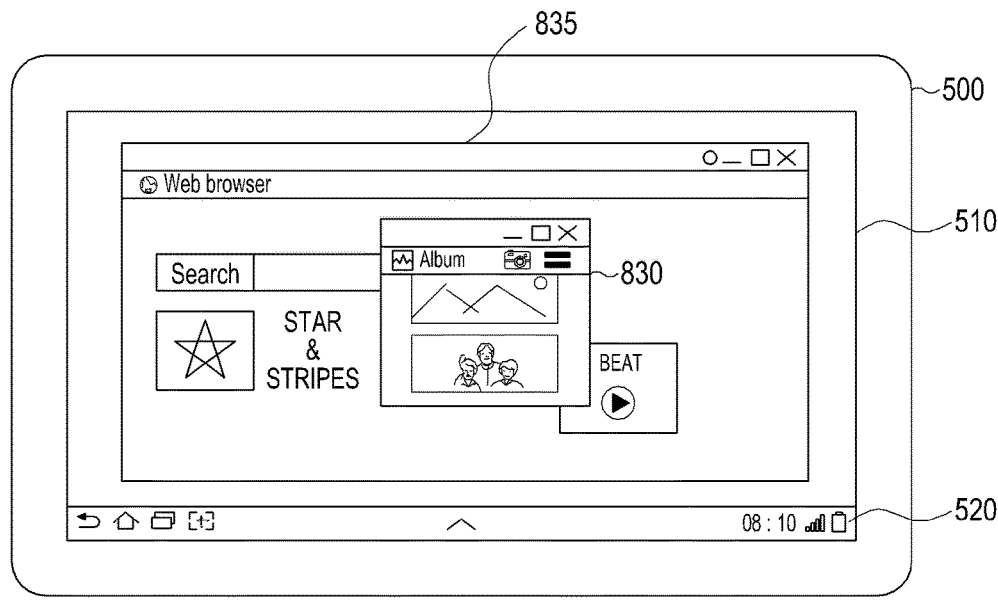
FIGS. 8A to 8E show screens of a display device according to an exemplary embodiment of the present invention.

In FIG. 8A, it is assumed that a top-level display command is entered in a first window 830. The controller 110 sets the top display level for the first window 830, and displays the first window 830 to cover a second window 835.

Figure 8B:
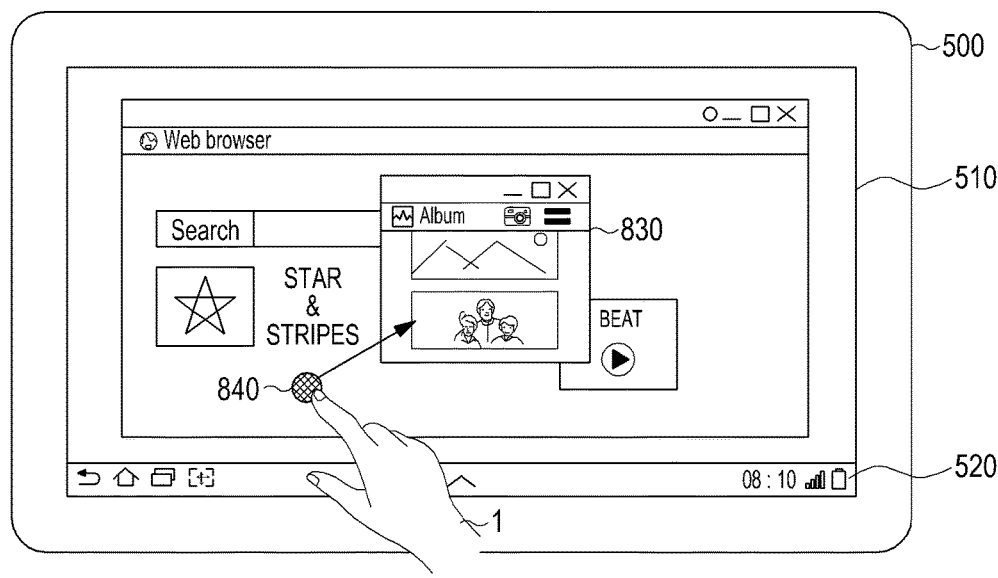

In FIG. 8B, a user 1 enters a top-level display window pause event. Entering the top-level display window pause event may correspond to entering a drag 840 from an outside to an inside of the top-level display window.

Figure 8C:
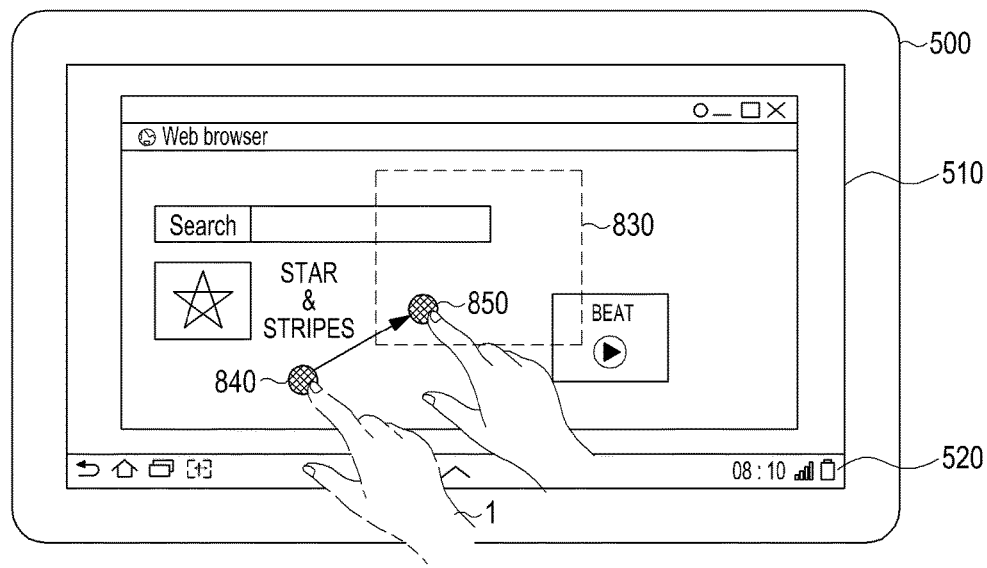

In FIG. 8C, the controller 110 may determine whether a top-level display window pause event is entered. If a top-level display window pause event is entered, the controller 110 stops displaying the top-level display window 830. If a drag 850 enters the top-level display window 830, the controller 110 stops displaying the top-level display window 830.

Figure 8D:
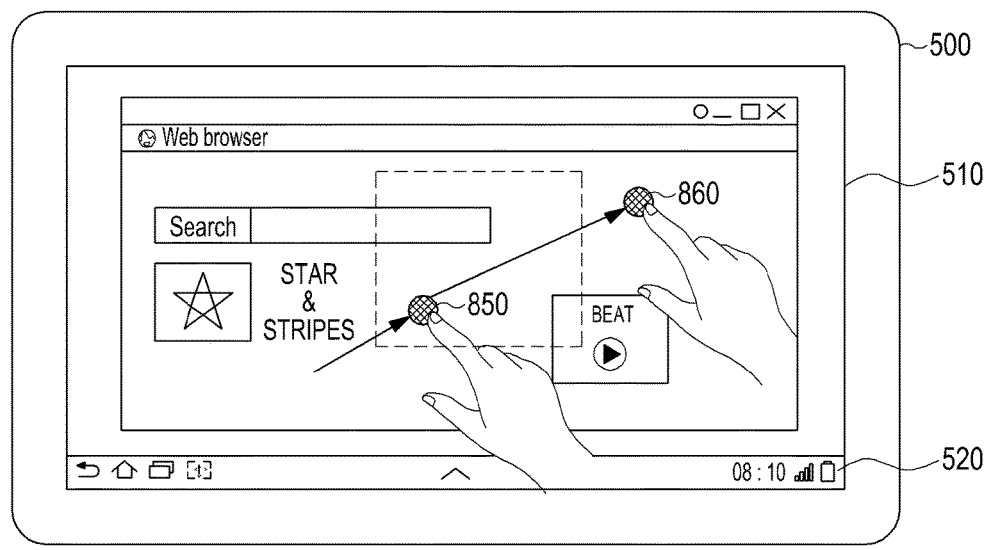
Figure 8E:
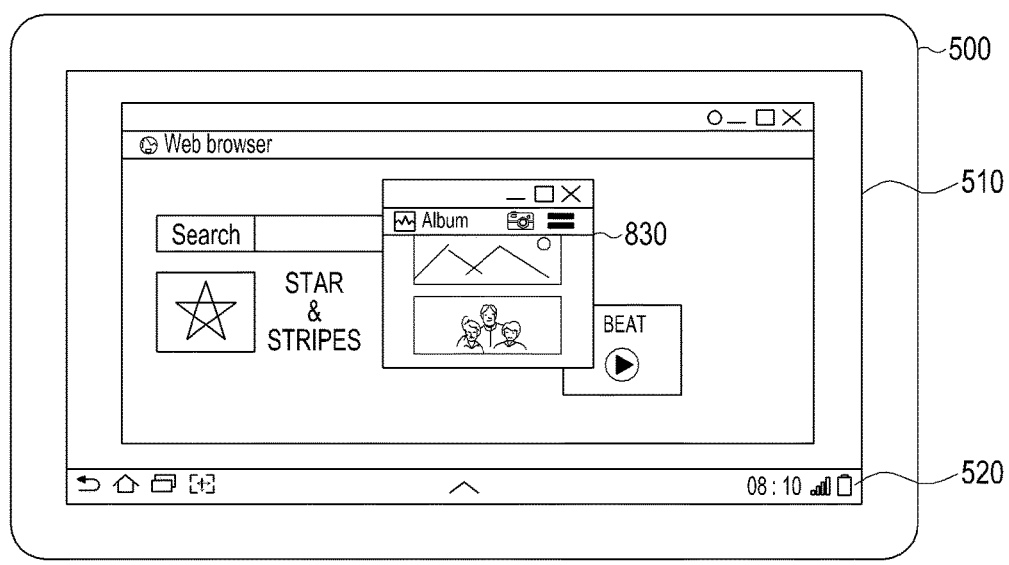

The controller 110 stops displaying the top-level display window 830 until the top-level display window pause event ends. For example, the controller 110 may stop displaying the top-level display window 830 until the drag ends. As shown in FIG. 8D, the controller 110 may stop displaying the top-level display window 830 even if a drag 860 passes through the top-level display window 830. As shown in FIG. 8E, if the drag input ends, the controller 110 displays again the top-level display window 830 in the top level.

The controller 110 may stop displaying the top-level display window 830 only while a drag passes through the top-level display window 830. The controller 110 may stop displaying the top-level display window 830 only for a predetermined time.

When the top-level display window 830 is not displayed, the controller 110 may display again the top-level display window 830 in response to a flick motion in the position of the top-level display window 830 from the user. It will be apparent to those of ordinary skill in the art that the event for pause and redisplay of the top-level display window 830 may be easily modified.

For example, a gesture or a timeout event for temporarily stopping (or pausing) displaying an application fixed to the top level on the Z-order of the screen may be used. The display device may temporarily stop displaying the top-level application with a touch-and-move gesture by the user's fingertip. To this end, the user may touch up the non-displayed application, or perform a touch action of getting out of an area of the non-displayed application.

It will be appreciated that the exemplary embodiments of the present invention may be implemented in the form of hardware, software, or a combination of hardware and software. The software may be stored, for example, in erasable and/or rewritable volatile or non-volatile storage devices including a storage device such as ROM, or for example, in memories such as RAMs, memory chips, memory devices and Integrated Circuits (ICs), or for example, in optically or magnetically recordable machine-readable (e.g., computer-readable) storage media such as CDs, DVDs, magnetic disks and magnetic tapes. The window display method of the present invention may be implemented by a computer or a mobile terminal that has a controller and a memory. The memory may be an example of the machine-readable storage media suitable for storing the program(s) that includes instructions for implementing exemplary embodiments of the present invention. Therefore, the present invention includes machine-readable (or computer-readable) storage media for storing the program(s) that includes codes for implementing the device and/or method defined in the appended claims.

In addition, the device may receive and store the program from a program provision device that is connected to the device in a wired or wireless manner. The program provision device may include a memory for storing the program including instructions for performing the window display method by the display device, and information needed for the window display method, a communication unit for performing wired/wireless communications with the display device, and a controller for transmitting the program to a receiving device automatically or upon request.

As is apparent from the foregoing description, the exemplary embodiments of the present invention provide a display device for simultaneously displaying multiple applications, and a method for controlling the same. In particular, exemplary embodiments of the present invention provide a structure that displays a specific application that the user wants to watch continuously, in the top level at all times. Accordingly, the user may continuously watch a screen of the specific application while executing another application, thus maximizing the user convenience.

For example, in a scenario where the user performs another task while watching a specific video, a window of the specific video may be displayed in the top level even though the user touches an application for another task, making it possible for the user to continuously watch the video. In another scenario where the user desires to check another application temporarily while displaying a specific application in the top level, the user may temporarily stop displaying the top-level display window by a simple input such as a drag. The top-level display window, the display of which is temporarily stopped, may be displayed again if the top-level display window pause event ends, for example, if the drag ends, allowing the user to easily check the application execution screens.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for controlling an electronic device, the method comprising:
    displaying, on a touch screen, a first window in which an execution screen of a first application is displayed and a second window in which an execution screen of a second application is displayed, wherein at least part of the first window is covering at least part of the second window based on a display order of the first window and the second window which is set according to a corresponding task priority of each application;
    receiving, through the touch screen, a touch input on the second window outside of a boundary of the first window;
    detecting an event for temporarily stopping the displaying of the at least part of the first window, the event comprising continuous moving of the touch input within the boundary of the first window;
    stopping, in response to the event, the displaying of the at least part of the first window while the touch input is maintained within the boundary of the first window, such that the at least part of the second window which was covered by the at least part of the first window is displayed on the touch screen, wherein the of at least part of the first window retains its position prior to and during the event; and
    in response to the continuous moving of the touch input being detected outside the boundary of the first window, resuming to display the at least part of the first window at the retained position such that the at least part of the first window covers the at least part of the second window.

2. The method of claim 1, wherein the stopping the displaying of the at least part of the first window comprises: adjusting a visibility of the at least part of the first window to zero (0), adjusting a display position of the first window to the outside of the touch screen, or adjusting a size of the first window to zero (0).

3. The method of claim 1, further comprising stopping the displaying of the first window until a predetermined time has elapsed since a time that the touch input was input.

4. The method of claim 1, further comprising stopping the displaying of the first window while the continuous moving of the touch input passes through an inner area of the first window.

5. An electronic device comprising:
    a touch screen; and
    at least one processor configured to:
        display, on the touch screen, a first window in which an execution screen of a first application is displayed and a second window in which an execution screen of a second application is displayed, wherein at least part of the first window is covering at least part of the second window based on a display order of the first window and the second window which is set according to a corresponding task priority of each application,
        receive, through the touch screen, a touch input on the second window outside of a boundary of the first window,
        detect an event for temporarily stopping the displaying of the at least part of the first window, the event comprising continuous moving of the touch input within the boundary of the first window,
        stop, in response to the event, the displaying of the at least part of the first window while the touch input is maintained within the boundary of the first window, such that the at least part of the second window which was covered by the at least part of the first window is displayed on the touch screen, wherein the at least part of the first window retains its position prior to and during the event, and
        in response to the continuous moving of the touch input being detected outside the boundary of the first window, resume to display the at least part of the first window at the retained position such that the at least part of the first window covers the at least part of the second window.

6. The electronic device of claim 5, wherein, to stop the displaying of the at least part of the first window, the at least one processor is further configured to adjust a visibility of the at least part of the first window to zero (0), adjusts a display position of a top the first window to the outside of the touch screen, or adjusts a size of the first window to zero (0).

7. The electronic device of claim 5, wherein the at least one processor is further configured to stop the displaying of the first window until a predetermined time has elapsed since a time that the touch input was input.

8. The electronic device of claim 5, wherein the at least one processor is further configured to stop the displaying of the first window while the continuous moving of the touch input passes through an inner area of the first window.

* * * * *